(12) United States Patent
Yokoyama et al.

(10) Patent No.: US 8,005,904 B2
(45) Date of Patent: Aug. 23, 2011

(54) ELECTRONIC BUSINESS CARD EXCHANGE SYSTEM AND METHOD

(75) Inventors: Keiichi Yokoyama, Chofu (JP); Yasuhiko Mori, Chofu (JP); Makoto Fukuda, Chofu (JP); Yoshiaki Hara, Chofu (JP); Rajesh Ramanathan, Redmond, WA (US); Christopher C. Yu, Chofu (JP); Fumiaki Yagi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/917,673

(22) PCT Filed: Jun. 29, 2006

(86) PCT No.: PCT/US2006/025574
§ 371 (c)(1),
(2), (4) Date: Jan. 22, 2009

(87) PCT Pub. No.: WO2007/005606
PCT Pub. Date: Jan. 11, 2007

(65) Prior Publication Data
US 2009/0216839 A1    Aug. 27, 2009

(30) Foreign Application Priority Data
Jun. 30, 2005  (JP) .................... 2006-192933

(51) Int. Cl.
  *G06F 15/173* (2006.01)
  *H04L 29/06* (2006.01)
  *H04L 9/32* (2006.01)
(52) U.S. Cl. ............... 709/206; 713/150; 705/50
(58) Field of Classification Search .......... 709/206; 713/150; 705/50
See application file for complete search history.

(56) References Cited

U.S. PATENT DOCUMENTS

| | | | |
|---|---|---|---|
| 5,493,105 A | 2/1996 | Desai | 235/375 |
| 5,732,229 A | 3/1998 | Dickinson | 395/334 |
| 5,764,629 A * | 6/1998 | Bower et al. | 370/296 |
| 5,774,117 A | 6/1998 | Kukkal et al. | 345/330 |

(Continued)

FOREIGN PATENT DOCUMENTS

JP    07-064923    10/1995

(Continued)

OTHER PUBLICATIONS

PCT Application No. PCT/US2006/17582, International Search Report, Jul. 27, 2007, pp. 7.

(Continued)

*Primary Examiner* — Alina N. Boutah
(74) *Attorney, Agent, or Firm* — Merchant & Gould

(57) ABSTRACT

To provide a user with better experience of cooperation between an electronic business card processing program and a communication program when exchanging electronic business cards. Electronic business cards are stored in a DB server, which is one of storages for a communication program, as well as an electronic business card local file. Thus, even if a PC is a company's PC, for example, the electronic business cards can be viewed by accessing the DB server from another PC or the like outside an office. Further, the electronic business card processing program operates with the communication program as backend, however, the electronic business card processing program may not be installed on a PC in some cases. Even in such a case, the communication program alone can display received electronic business cards that are stored in the communication program local file on the screen of a display.

13 Claims, 8 Drawing Sheets

U.S. PATENT DOCUMENTS

| | | | | |
|---|---|---|---|---|
| 5,845,261 | A * | 12/1998 | McAbian | 705/26 |
| 5,852,807 | A | 12/1998 | Skarbo et al. | 705/7 |
| 6,137,710 | A * | 10/2000 | Iwasaki et al. | 365/52 |
| 6,157,954 | A * | 12/2000 | Moon et al. | 709/228 |
| 6,195,686 | B1 * | 2/2001 | Moon et al. | 709/206 |
| 6,254,001 | B1 | 7/2001 | Chan | 235/380 |
| 6,397,219 | B2 * | 5/2002 | Mills | 1/1 |
| 6,442,263 | B1 * | 8/2002 | Beaton et al. | 379/142.04 |
| 6,533,171 | B1 | 3/2003 | Porter | 235/380 |
| 6,760,728 | B1 | 7/2004 | Osborn | 1/1 |
| 6,816,725 | B1 | 11/2004 | Lemke et al. | |
| 6,857,072 | B1 | 2/2005 | Schuster et al. | 713/160 |
| 6,868,426 | B1 | 3/2005 | Mankoff | 707/104.1 |
| 6,873,861 | B2 | 3/2005 | Awada et al. | |
| 6,883,000 | B1 | 4/2005 | Gropper | 1/1 |
| 6,888,927 | B1 | 5/2005 | Cruickshank et al. | 379/88.11 |
| 6,889,213 | B1 | 5/2005 | Douvikas et al. | 705/67 |
| 6,954,934 | B2 | 10/2005 | Kumar | 719/317 |
| 6,983,371 | B1 * | 1/2006 | Hurtado et al. | 713/189 |
| 7,003,546 | B1 * | 2/2006 | Cheah | 709/200 |
| 7,007,068 | B2 * | 2/2006 | Morkel | 709/206 |
| 7,017,109 | B1 | 3/2006 | Douvikas et al. | 715/501.1 |
| 7,039,869 | B2 | 5/2006 | Smith | 715/716 |
| 7,043,531 | B1 | 5/2006 | Seibel et al. | 709/206 |
| 7,047,041 | B2 | 5/2006 | Vänskä et al. | 455/558 |
| 7,062,656 | B2 * | 6/2006 | Richards et al. | 713/185 |
| 7,109,985 | B2 | 9/2006 | Spencer et al. | 345/418 |
| 7,228,335 | B2 | 6/2007 | Caughey | |
| 7,246,099 | B2 | 7/2007 | Feldhahn | 705/65 |
| 7,255,267 | B2 | 8/2007 | Chao | 235/380 |
| 7,280,975 | B1 | 10/2007 | Donner | 705/10 |
| 7,289,110 | B2 | 10/2007 | Hansson | 345/173 |
| 7,322,007 | B2 | 1/2008 | Schowtka et al. | 715/513 |
| 7,337,127 | B1 | 2/2008 | Smith et al. | 705/14 |
| 7,387,234 | B2 | 6/2008 | Kanatani et al. | 235/375 |
| 7,451,099 | B2 | 11/2008 | Henkin et al. | 705/14 |
| 7,483,179 | B2 | 1/2009 | Stumbo et al. | 358/402 |
| 7,753,260 | B2 | 7/2010 | Kanatani et al. | 235/380 |
| 7,814,438 | B2 | 10/2010 | Grossman et al. | 715/854 |
| 2001/0021935 | A1 * | 9/2001 | Mills | 707/513 |
| 2001/0027472 | A1 | 10/2001 | Guan | |
| 2001/0032251 | A1 * | 10/2001 | Rhoads et al. | 709/217 |
| 2002/0013815 | A1 * | 1/2002 | Obradovich et al. | 709/204 |
| 2002/0035566 | A1 | 3/2002 | Rugg | 707/100 |
| 2002/0055955 | A1 | 5/2002 | Lloyd-Jones et al. | 707/512 |
| 2002/0095384 | A1 * | 7/2002 | Pestoni et al. | 705/51 |
| 2002/0107938 | A1 | 8/2002 | Moroney et al. | 709/218 |
| 2002/0116396 | A1 * | 8/2002 | Somers et al. | 707/200 |
| 2002/0130185 | A1 * | 9/2002 | LaForge et al. | 235/487 |
| 2002/0133482 | A1 | 9/2002 | Wen Hung | 707/3 |
| 2002/0138633 | A1 | 9/2002 | Angwin et al. | 709/229 |
| 2002/0152086 | A1 | 10/2002 | Smith et al. | 705/1 |
| 2002/0188606 | A1 | 12/2002 | Sun et al. | 707/10 |
| 2003/0020959 | A1 | 1/2003 | Henry | 358/402 |
| 2003/0050920 | A1 | 3/2003 | Sun | 707/2 |
| 2003/0066877 | A1 | 4/2003 | Howard et al. | 235/380 |
| 2003/0110130 | A1 * | 6/2003 | Pelletier | 705/50 |
| 2003/0131001 | A1 | 7/2003 | Matsuo | 707/9 |
| 2003/0158860 | A1 | 8/2003 | Caughey | |
| 2003/0158893 | A1 | 8/2003 | Komatsu et al. | 709/203 |
| 2003/0163705 | A1 | 8/2003 | Richards, Jr. et al. | 713/182 |
| 2003/0203744 | A1 * | 10/2003 | Otsuka | 455/551 |
| 2004/0019521 | A1 | 1/2004 | Birmingham | 705/14 |
| 2004/0076345 | A1 | 4/2004 | Olszak et al. | 382/309 |
| 2004/0153328 | A1 | 8/2004 | Macholda | 705/1 |
| 2004/0181517 | A1 | 9/2004 | Jung et al. | 707/3 |
| 2004/0181540 | A1 | 9/2004 | Jung et al. | 707/100 |
| 2004/0207878 | A1 | 10/2004 | Ferlitsch | 358/2.1 |
| 2004/0243496 | A1 | 12/2004 | Kim et al. | 705/35 |
| 2004/0243930 | A1 | 12/2004 | Schowtka et al. | 715/513 |
| 2005/0010490 | A1 * | 1/2005 | Liu | 705/26 |
| 2005/0091074 | A1 | 4/2005 | Feldhahn | 705/1 |
| 2005/0103838 | A1 * | 5/2005 | Slotkin et al. | 235/380 |
| 2005/0122543 | A1 | 6/2005 | Walker | 358/1.18 |
| 2005/0165621 | A1 * | 7/2005 | Lapstun et al. | 705/1 |
| 2005/0182644 | A1 | 8/2005 | Douvikas et al. | 705/1 |
| 2005/0233697 | A1 * | 10/2005 | Yu | 455/41.3 |
| 2005/0239439 | A1 * | 10/2005 | Manabe | 455/410 |
| 2005/0251448 | A1 * | 11/2005 | Gropper | 705/14 |
| 2005/0289474 | A1 | 12/2005 | Master et al. | 715/765 |
| 2006/0038447 | A1 * | 2/2006 | Bruelle-Drews | 307/10.1 |
| 2006/0065707 | A1 * | 3/2006 | Kanatani et al. | 235/375 |
| 2006/0065708 | A1 * | 3/2006 | Kanatani et al. | 235/375 |
| 2006/0075050 | A1 * | 4/2006 | Kanatani et al. | 709/206 |
| 2006/0075231 | A1 * | 4/2006 | Yu et al. | 713/168 |
| 2006/0088214 | A1 | 4/2006 | Handley et al. | 382/176 |
| 2006/0184574 | A1 | 8/2006 | Wu et al. | 707/104.1 |
| 2006/0229988 | A1 * | 10/2006 | Oshima et al. | 705/50 |
| 2006/0270388 | A1 * | 11/2006 | Veeramachaneni et al. | 455/412.1 |
| 2006/0293903 | A1 | 12/2006 | Ramanathan et al. | 705/1 |
| 2006/0293904 | A1 | 12/2006 | Ramanathan et al. | 705/1 |
| 2006/0293905 | A1 * | 12/2006 | Ramanathan et al. | 705/1 |
| 2007/0156831 | A1 * | 7/2007 | Quine | 709/206 |
| 2009/0116687 | A1 * | 5/2009 | Rhoads et al. | 382/100 |
| 2009/0217199 | A1 * | 8/2009 | Hara et al. | 715/808 |

FOREIGN PATENT DOCUMENTS

| | | |
|---|---|---|
| JP | 08-008962 | 1/1996 |
| JP | 10-190645 | 7/1998 |
| JP | 2001-249863 | 9/2001 |
| JP | 2001-282793 | 10/2001 |
| JP | 2002-297855 | 10/2002 |
| JP | 2002/334046 | 11/2002 |
| JP | 2003-006161 | 1/2003 |
| JP | 2003-30211 | 1/2003 |
| JP | 2003-123035 | 4/2003 |
| JP | 2003-309552 | 10/2003 |
| JP | 2003-348077 | 12/2003 |
| JP | 2004-164166 | 6/2004 |
| JP | 2004-192138 | 7/2004 |
| JP | 2004-362264 | 12/2004 |
| JP | 2005-018746 | 1/2005 |
| JP | 4416644 | 12/2009 |
| WO | WO 99/29127 | 10/1999 |

OTHER PUBLICATIONS

PCT, Application No. PCT/US2006/17721, International Search Report, Aug. 15, 2007, pp. 7.

U.S. Office Action mailed Mar. 31, 2008 in U.S. Appl. No. 11/159,837.

U.S. Office Action mailed Apr. 7, 2008 in U.S. Appl. No. 11/159,838.

U.S. Office Action mailed Oct. 26, 2007 in U.S. Appl. No. 11/023,614.

U.S. Final Office Action mailed Jun. 16, 2008 in U.S. Appl. No. 11/023,614.

U.S. Office Action mailed Feb. 6, 2006 in U.S. Appl. No. 11/023,602.

U.S. Final Office Action mailed Jul. 24, 2006 in U.S. Appl. No. 11/023,602.

U.S. Office Action mailed Dec. 19, 2007 in U.S. Appl. No. 11/023,602.

U.S. Office Action mailed May 13, 2008 in U.S. Appl. No. 11/023,617.

U.S. Office Action mailed Nov. 6, 2006 in U.S. Appl. No. 11/023,612.

U.S. Office Action mailed Apr. 19, 2007 in U.S. Appl. No. 11/023,612.

U.S. Final Office Action mailed Sep. 25, 2007 in U.S. Appl. No. 11/023,612.

U.S. Final Office Action mailed Dec. 3, 2008 in U.S. Appl. No. 11/159,837.

U.S. Final Office Action mailed Jan. 16, 2009 in U.S. Appl. No. 11/159,838.

U.S. Office Action mailed Jan. 21, 2009 in U.S. Appl. No. 11/023,614.

U.S. Office Action mailed Mar. 24, 2009 in U.S. Appl. No. 11/159,840.

U.S. Office Action mailed May 14, 2009 in U.S. Appl. No. 11/159,837.

U.S. Final Office Action mailed Aug. 7, 2009 in U.S. Appl. No. 11/023,614.

(1997) vCard: The Electronic Business Card:; Version 2.1; A versit Consortium White Paper; http://www.imc.org/pdi/vcardwhite.ht.; Jan. 1997.

U.S. Office Action mailed Jun. 8, 2009 in U.S. Appl. No. 11/023,617.
U.S. Office Action mailed Sep. 4, 2009 in U.S. Appl. No. 11/023,602.
U.S. Final Office Action mailed Dec. 3, 2009 in U.S. Appl. No. 11/159,837.
U.S. Office Action mailed Dec. 15, 2009 in U.S. Appl. No. 11/023,614.
U.S. Final Office Action mailed Jan. 6, 2010 in U.S. Appl. No. 11/023,602.
U.S. Final Office Action mailed Jan. 27, 2010 in U.S. Appl. No. 11/023,617.
U.S. Final Office Action mailed Oct. 15, 2009, in U.S. Appl. No. 11/159,840.
U.S. Final Office Action mailed Mar. 15, 2010, in U.S. Appl. No. 11/159,840.
PCT, Application No. PCT/U2006/017582, International Search Report, May 4, 2010, pp. 10.
U.S. Final Office Action mailed Jul. 7, 2010, in U.S. Appl. No. 11/159,840.
European Office Action, dated Jul. 6, 2010, cited in Appl No. 06 770 057.5.
U.S. Office Action mailed Feb. 16, 2007 in U.S. Appl. No. 11/023,602.
U.S. Final Office Action mailed Feb. 13, 2009 in U.S. Appl. No. 11/023,617.
U.S. Final Office Action mailed Aug. 4, 2010 in U.S. Appl. No. 11/023,617.
Notice of Rejection mailed Oct. 22, 2010, in Japanese Patent Application No. 2004-381102, with English translation.
Notice of Rejection mailed Oct. 22, 2010, in Japanese Patent Application No. 2005-192933, with English translation.
U.S. Office Action mailed May 12, 2010, in U.S. Appl. No. 11/159,837.
U.S. Final Office Action mailed May 19, 2010, in U.S. Appl. No. 11/023,614.
U.S. Office Action mailed Jan. 10, 2011, in U.S. Appl. No. 11/023,614.
U.S. Office Action mailed Jan. 24, 2011 in U.S. Appl. No. 11/023,617.
Response to Non-Final Office Action mailed Feb. 6, 2006, filed May 4, 2006 in U.S. Appl. No. 11/023,602.
Response to Final Office Action mailed Jul. 24, 2006, filed Sep. 15, 2006 in U.S. Appl. No. 11/023,602.
Advisory Office Action mailed Oct. 2, 2006, in U.S. Appl. No. 11/023,602.
Response to Advisory Action mailed Oct. 2, 2006, filed Nov. 30, 2006 in U.S. Appl. No. 11/023,602.
Response to Non-Final Office Action mailed Nov. 6, 2006, filed Feb. 6, 2007 in U.S. Appl. No. 11/023,612.
Response to Non-Final Office Action mailed Apr. 19, 2007, filed Jul. 19, 2007 in U.S. Appl. No. 11/023,612.
Response to Final Office Action mailed Sep. 25, 2007, filed Jan. 24, 2008 in U.S. Appl. No. 11/023,612.
Response to Non-Final Office Action mailed Oct. 26, 2007, filed Mar. 26, 2008 in U.S. Appl. No. 11/023,614.
Response to Non-Final Office Action mailed Dec. 19, 2007, filed Jun. 19, 2008 in U.S. Appl. No. 11/023,602.
Notice of Allowance mailed Feb. 13, 2008, in U.S. Appl. No. 11/023,612.
Response to Non-Final Office Action mailed Mar. 31, 2008, filed Sep. 2, 2008 in U.S. Appl. No. 11/159,837.
Response to Non-Final Office Action mailed Apr. 7, 2008, filed Sep. 8, 2008 in U.S. Appl. No. 11/159,838.
Response to Non-Final Office Action mailed May 13, 2008, filed Nov. 12, 2008 in U.S. Appl. No. 11/023,617.
Response to Final Office Action mailed Jun. 16, 2008, filed Dec. 16, 2008 in U.S. Appl. No. 11/023,614.
Notice of Allowance mailed Oct. 20, 2008, in U.S. Appl. No. 11/023,602.
Response to Final Office Action mailed Dec. 3, 2008, filed Mar. 3, 2009 in U.S. Appl. No. 11/159,837.
Response to Non-Final Office Action mailed Jan. 21, 2009, filed May 21, 2009 in U.S. Appl. No. 11/023,614.
Notice of Allowance mailed Jan. 26, 2009 in U.S. Appl. No. 11/023,602.
Response to Final Office Action mailed Feb. 13, 2009, filed May 13, 2009 in U.S. Appl. No. 11/023,617.
Response to Non-Final Office Action mailed Mar. 24, 2009, filed Jul. 24, 2009 in U.S. Appl. No. 11/159,840.
Response to Non Final Office Action mailed May 14, 2009, filed Aug. 14, 2009 in U.S. Appl. No. 11/159,837.
Response to Non-Final Office Action mailed Jun. 8, 2009, filed Sep. 8, 2009 in U.S. Appl. No. 11/023,617.
Response to Final Office Action mailed Aug. 7, 2009, filed Nov. 9, 2009 in U.S. Appl. No. 11/023,614.
Response to Non-Final Office Action mailed Sep. 4, 2009, filed Dec. 4, 2009 in U.S. Appl. No. 11/023,602.
Response to Final Office Action mailed Oct. 15, 2009, filed Jan. 14, 2010 in U.S. Appl. No. 11/159,840.
Response to Final Office Action mailed Dec. 3, 2009, filed Mar. 3, 2010 in U.S. Appl. No. 11/159,837.
Response to Non-Final Office Action mailed Dec. 15, 2009, filed Mar. 15, 2010 in U.S. Appl. No. 11/023,614.
Response to Non-Final Office Action mailed Mar. 15, 2010, filed Jun. 15, 2010 in U.S. Appl. No. 11/159,840.
Response to Final Office Action mailed May 12, 2010, filed Sep. 13, 2010 in U.S. Appl. No. 11/159,837.
Response to Final Office Action mailed May 19, 2010, filed Nov. 10, 2010 in U.S. Appl. No. 11/023,614.
Notice of Allowance mailed May 20, 2010 in U.S. Appl. No. 11/023,602.
Response to Final Office Action mailed Jul. 7, 2010, filed Nov. 8, 2010 in U.S. Appl. No. 11/159,840.
Response to Non-Final Office Action mailed Aug. 4, 2010, filed Nov. 4, 2010 in U.S. Appl. No. 11/023,617.
Notice of Allowance mailed Nov. 15, 2010 in U.S. Appl. No. 11/159,837.
Sub Notice of Allowance mailed Feb. 3, 2011 in U.S. Appl. No. 11/159,837.
Notice of Allowance mailed Apr. 11, 2011 in U.S. Appl. No. 11/159,837.
Japanese Office Action mailed Feb. 15, 2011, cited in Application No. 2004-381102.
Notice of Rejection mailed Apr. 28, 2011, in Japanese Patent Application No. 2008-518157, with English translation.

* cited by examiner

ELECTRONIC BUSINESS CARD EXCHANGE SYSTEM AND METHOD

BACKGROUND OF THE INVENTION

1. Field of the Invention

The present invention relates to an electronic business card exchange system and method, and particularly, to an electronic business card exchange system for transmitting/receiving business card information over a network, a terminal for exchanging such an electronic business card, an electronic business card exchange method, and a program.

2. Description of the Related Art

Instead of giving a paper business card to someone, it is now possible to communicate information described on an electronic business card such as name, organization name and telephone number to someone using electronic mail over the Internet. One of well-known data formats for electronic business card for use over the Internet is RFC2426-vCard MIME Directory Profile. For example, such a format is disclosed by Dawson and one other "vCard MIME Directory Profile," (Online) September, 1998 (searched on 28 Dec. 2004). Hereinafter, information relating to electronic mail or electronic business card such as name, organization name and telephone number will be collectively referred to as contact information, and sometimes as business card information as necessary particularly in connection with business cards.

Business card information transmitted in the data format contains character strings for a numbers of sets of contact information to be superimposed on a business card image. An electronic business card contains an image of the card and its business card information and is presented on a display screen of a recipient's computer as shown in FIG. 1, for example.

FIG. 1 illustrates an electronic business card displayed on a computer display screen. The electronic business card of FIG. 1 shows the image of the card 100 as well as business card information including company name 101, job title 102, personal name 103, ZIP code 104, company address 105, e-(electronic) mail address 106, telephone number 107, and URL 108. Contact information such as 101 to 108 is received by a receiving computer in the form of character codes, and after being converted from the character codes to images by the receiving computer, converted images are superimposed on the business card image 100 to be presented on the display screen.

Such standardization of business card information has enabled improvement of convenience for users in the field of electronic commerce and the like.

On the market, now available are electronic business card exchange systems that produce and exchange electronic business cards through cooperative operation of an electronic business card processing program and a communication program. For instance, InterConnect2004™, which is an electronic business card processing program, realizes exchange of electronic business cards through cooperation with Outlook2003™, a communication program, as backend. InterConnect2004™, an electronic business card processing program, mainly realizes the capability of composing electronic business cards. Outlook2003™, a communication program, mainly realizes the capability of exchanging electronic business cards using electronic mail.

FIG. 8 illustrates an example of system configuration of such an electronic business card exchange system. The electronic business card system shown in FIG. 8 includes personal computers (hereinafter "PCs") 200 that are interconnected via a communication network 250.

Since the PCs 200 can be commercially available ones, their hardware will be described only briefly. The PC 200 includes a hard disk (hereinafter "HD") 210, a central processing unit (CPU) 221, a system memory 222, a display 223, an input device 224, and a communication device 225 such as a modem.

The CPU 221 executes various programs. The system memory 222 stores input/output information for the CPU 221. The display 223 displays information processing result from the CPU 221 and input information from the input device 224 on the display screen under the control of the CPU 221. The input device 224 has a pointing device such as a mouse as well as a keyboard, inputting information to the CPU 221.

The communication device 225 transmits/receives electronic mails to/from a mail server 260 within a provider over the communication network 250. The communication device 225 also connects to the communication network 250 to communicate with other PCs 200. The mail server 260 communicates electronic mails with another mail server 260 over the communication network 250. A database (DB) server 270 is a DB server maintained by a company when the PC 200 is a company PC, for example, providing database capabilities for managing various types of data.

The HD 210 stores therein such objects (i.e., data and programs) as follows. An electronic business card 201 is an object that is generated by an electronic business card processing program 202 or received from another PC 200 and stored in the HD 210. The electronic business card 201 is a data set (i.e., a collection of a plurality of data) including character strings in the form of character codes and image data for background images for the business card.

The electronic business card processing program 202 is a program having the capability of composing electronic business cards. An electronic business card local file 203 stores produced or received electronic business cards, information for managing such electronic business card (collectively referred to as management information), and various types of information relating to electronic business cards (collectively referred to as relevant information, encompassing management information). Upon installation, the electronic business card processing program 202 creates an electronic business card local file 203 having no contents in it as the initial state.

A communication program 204 is electronic mail software program for sending/receiving electronic business cards using electronic mail to/from other PCs 200 and also for sending/receiving general electronic mails not containing an electronic business card. A communication program local file 280 stores produced or received electronic mails, information for managing such electronic mails, and various types of information relating to electronic mail. Upon installation, the communication program 204 creates a communication program local file 280 having no contents in it as the initial state.

The electronic business card processing program 202 and the communication program 204 are installed in the HD 210 from a storage medium such as a compact disk (CD) read-only memory (-ROM) and a Floppy® disk or via a communication medium.

The communication program 204 transmits/receives electronic business cards and/or electronic mails via the mail server 260. The communication program 204 stores or retrieves contact information for an electronic mail received or to be transmitted to/from the storage for the communication program 204 (i.e., the communication program local file 280 and the DB server 270) as necessary. The communication program 204 stores or retrieves an electronic business card received or to be transmitted to/from the electronic business card local file 203 via the electronic business card processing program 202.

The electronic business card processing program 202 transmits a produced electronic business card via the communication program 204, and displays produced or received electronic business cards stored in the electronic business card local file 203 on the screen of the display 223.

However, with such an electronic business card system described above with reference to FIG. 8, one cannot view electronic business cards from outside an office when the PC 200 is a company PC, for example, because electronic business cards are stored only in the electronic business card local file 203. Additionally, although the electronic business card processing program 202 operates with the communication program 204 as backend, the electronic business card producing capability of the electronic business card processing program 202 and the electronic mail capability of the communication program 204 operate separately from each other.

Accordingly, the conventional art described above leaves a lot to be improved in that cooperation and collaboration of the functions of the electronic business card processing program 202 and the communication program 204 are thin in exchange of electronic business cards.

SUMMARY OF THE INVENTION

The present invention has been made in view of such circumstances, and an object of the invention is to provide an electronic business card exchange system and method that provides users with better experience of cooperation between an electronic business card processing program and a communication program when exchanging electronic business cards.

To attain the object, according to the invention, there is provided an electronic business card exchange system (FIG. 2) with a plurality of terminals (200) that exchange electronic business cards and a server (270), the terminals and the server being connected via a communication network (250), the system is characterized in that each of the terminals comprises: first storage means (280) capable of storing electronic business cards; second storage means (203) capable of storing electronic business cards; display means (223) capable of displaying an electronic business card; communication means (204) for performing processing including transmission and reception of an electronic business card and display of the electronic business card on the display means, the communication means storing a received electronic business card in the server and the first storage means; and electronic business card processing means (202) for performing processing including production of an electronic business card and display of the electronic business card on the display means, the electronic business card processing means for storing an electronic business card received via the communication means in the server and the first storage means, or in the second storage means.

Also, to attain the above object, according to the invention, an electronic business card exchange method for an electronic business card exchange system with a plurality of terminals exchanging electronic business cards and a server, the terminals and the server being connected via a communication network, the terminal having first storage means capable of storing electronic business cards, second storage means capable of storing electronic business cards, and display means capable of displaying an electronic business card, the method is characterized by comprising: a first storage step (S604) of, when communication means for performing processing including transmission and reception of an electronic business card and display of the electronic business card on the display means is selected, storing by the communication means a received electronic business card in the server and the first storage means; and a second storage step (S804 or S810) of, when electronic business card processing means for performing processing including production of an electronic business card and display of the electronic business card on the display means is selected, the electronic business card processing means storing an electronic business card received via the communication means in the server and the first storage means, or in the second storage means.

Reference numerals used in drawings for an embodiment that correspond to elements in Claims are shown in parentheses. However, elements set forth in Claims are not limited to elements of the embodiment shown in parentheses.

The invention has an operation that can give users better experience of cooperation between an electronic business card processing program and a communication program when exchanging electronic business cards.

The above and other objects, effects, features and advantages of the present invention will become more apparent from the following description of embodiments thereof taken in conjunction with the accompanying drawings.

DESCRIPTION OF THE PREFERRED EMBODIMENTS

Figure 1:
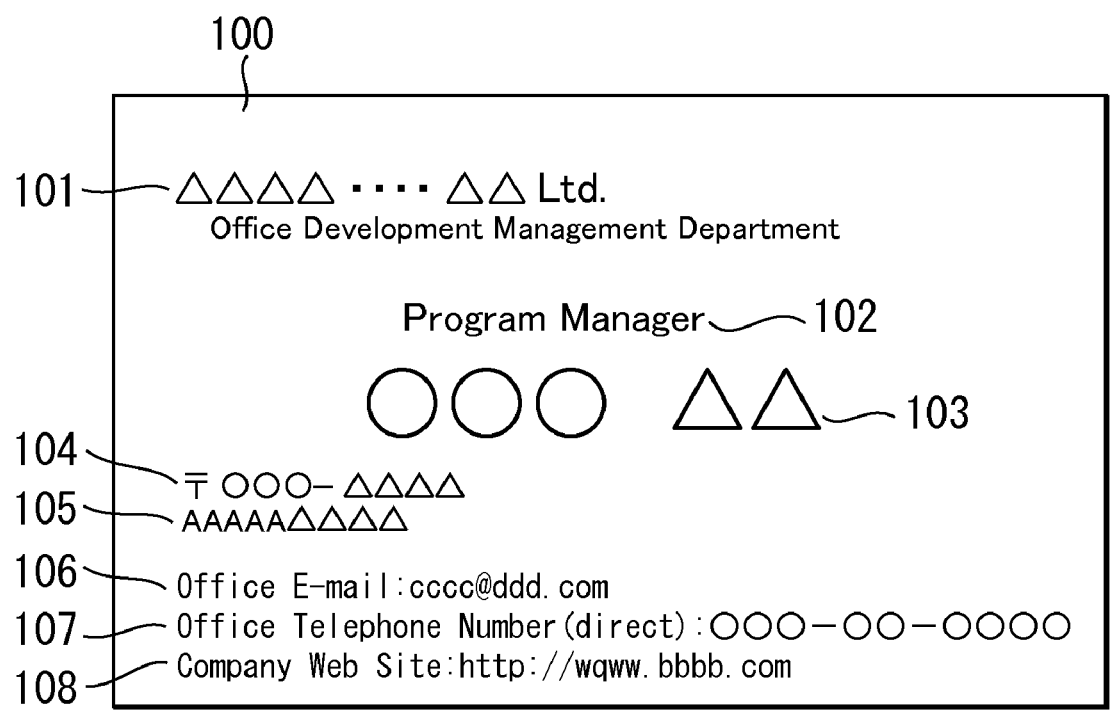
FIG. 1 illustrates an electronic business card shown on a computer display screen.

In the following, an embodiment to which the present invention can be applied will be described in detail with reference to drawings. In the drawings, elements that have similar functions are denoted with identical reference numerals and description on them will be omitted.

[Apparatus Configuration]

In this embodiment, an electronic business card exchange system will be described that creates and exchanges electronic business cards through cooperative operation of an electronic business card processing program and a communication program. The electronic business card processing program realizes exchange of electronic business cards through cooperation with the communication program as backend. The electronic business card processing program mainly realizes the capability of producing electronic business cards. The communication program mainly realizes the capability of exchanging electronic business cards by means of electronic mail.

Figure 2:
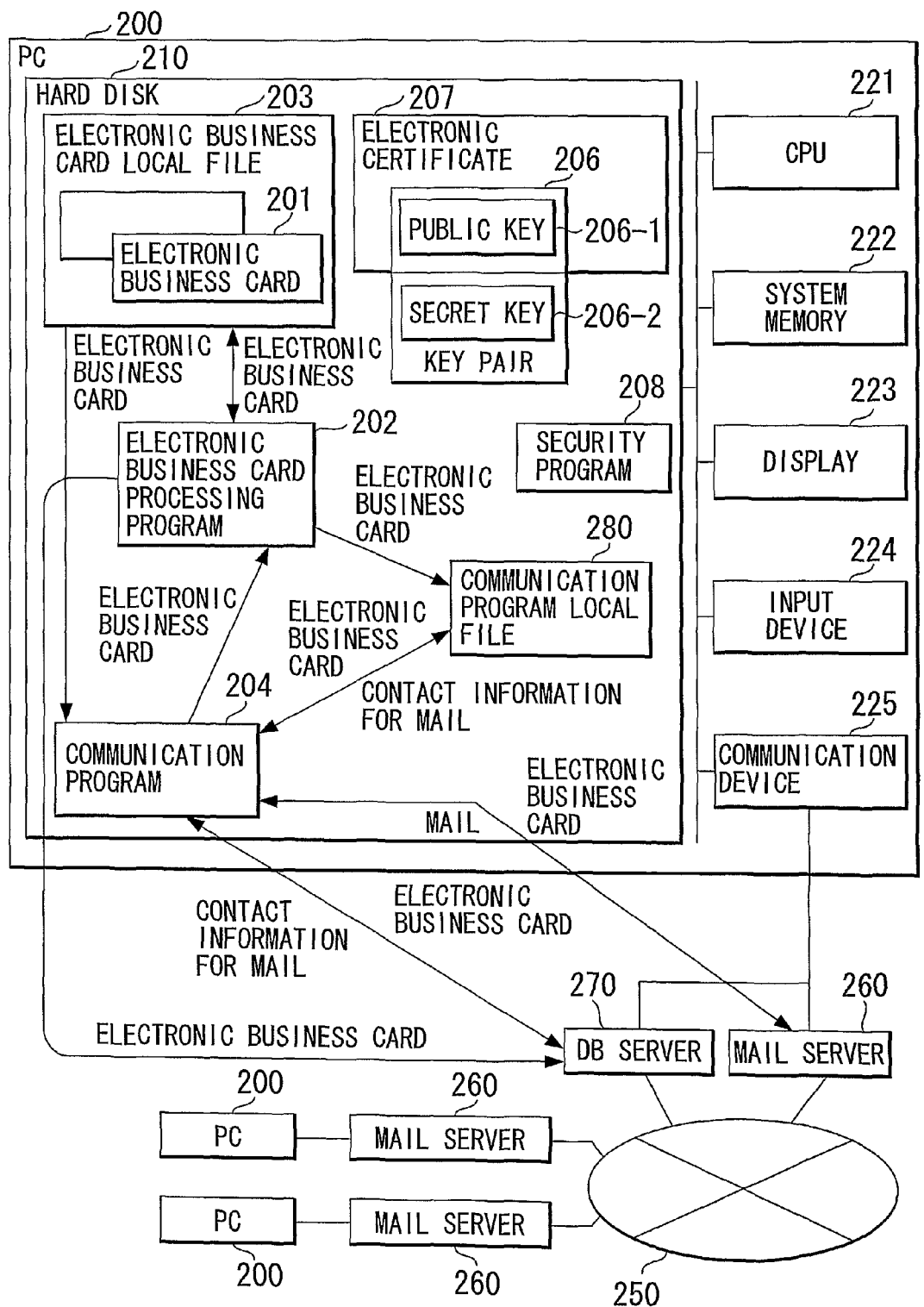
FIG. 2 illustrates a system configuration of an electronic business card exchange system of an embodiment to which the present invention can be applied.
Figure 8:
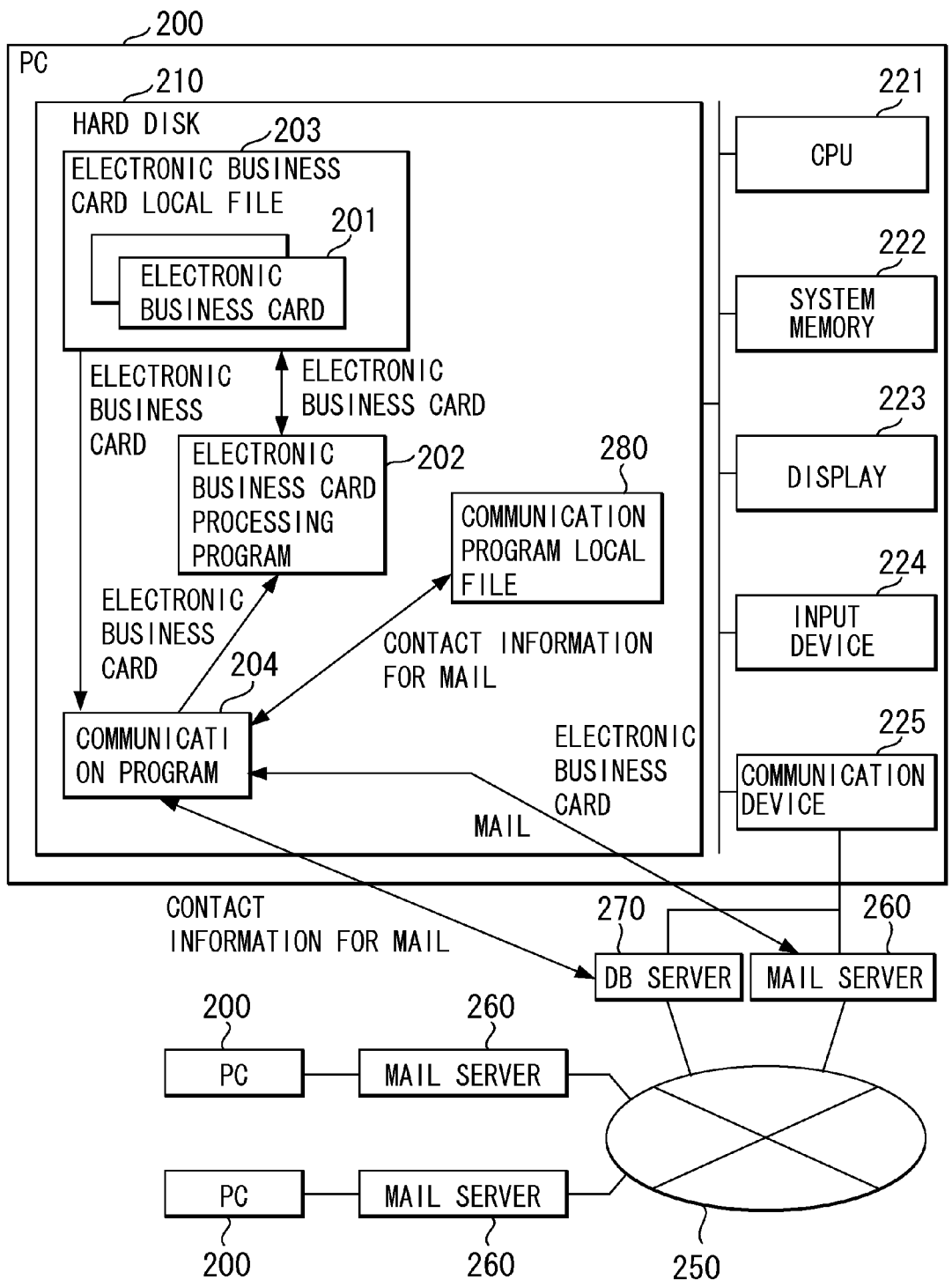
FIG. 8 shows an example of system configuration of a conventional electronic business card exchange system.

FIG. 2 illustrates a system configuration of the electronic business card exchange system of the embodiment. The electronic business card exchange system of the embodiment has some elements in common with the conventional system described above with reference to FIG. 8, and those elements having the same capability are indicated with the same reference numerals. Referring to FIG. 2, the electronic business card system of the embodiment will be described in detail.

The electronic business card exchange system shown in FIG. 2 includes personal computers (hereinafter "PC") 200 that are interconnected via a communication network 250. Since the PCs 200 can be commercially available ones, their hardware will be described only briefly. The PC 200 includes a hard disk (hereinafter "HD") 210, a central processing unit (CPU) 221, a system memory 222, a display 223, an input device 224, and a communication device 225 such as a modem.

The CPU 221 executes various programs. The system memory 222 stores input/output information for the CPU 221. The display 223 displays information processing result from the CPU 221 and input information from the input device 223 on the screen under the control of the CPU 221. The input device 224 has a pointing device such as a mouse as well as a keyboard, inputting information to the CPU 221.

The communication device 225 transmits/receives electronic mails to/from the mail server 260 within a provider over the communication network 250. The communication device 225 also connects to the communication network 250 to communicate with other PCs 200. The mail server 260 communicates electronic mails with another mail server 260 over the communication network 250. The database (DB) server 270 is a DB server maintained by a company when the PC 200 is a company PC, for example, providing database capabilities for managing various types of data.

The HD 210 stores therein such objects (i.e., data and programs) as follows: the electronic business card 201 is an object that is generated by the electronic business card processing program 202 or received from another PC 200 and stored in the HD 210. The electronic business card 201 is a data set (i.e., a collection of a plurality of data) including character strings in the form of character codes and image data for background images for the business card.

The electronic business card processing program 202 is a program that has electronic business card producing capability and various functions relating to the invention to be described later. The electronic business card local file 203 stores produced or received electronic business cards, information for managing such electronic business cards (collectively referred to as management information), and various information relating to electronic business card (referred to as relevant information, which encompasses management information). Upon installation, the electronic business card processing program 202 creates an electronic business card local file 203 having no contents in it as the initial state.

The communication program 204 is an e-mail software program for transmitting/receiving electronic business cards to/from other PCs 200 by means of electronic mail and also for transmitting/receiving general electronic mails not containing an electronic business card. The communication program 204 further provides various capabilities relating to the invention to be discussed later. The communication program local file 280 stores produced or received electronic mails, information for managing such electronic mails, various information relating to electronic mail, as well as received electronic business cards and management information for such business cards. Upon installation, the communication program 204 creates a communication program local file 280 having no contents in it as the initial state.

The electronic business card processing program 202 and communication program 204 are installed to the HD 210 from a storage medium such as a CD-ROM (compact disk read-only memory) or a Floppy® disk, or via a communication medium.

The communication program 204 transmits/receives electronic business cards and/or electronic mails via the mail server 260. The communication program 204 stores or retrieves contact information for electronic mails received or to be transmitted to/from its storage (i.e., the communication program local file 280 and the DB server 270) as necessary. The communication program 204 stores electronic business cards received or to be transmitted to its storage, and/or retrieves such electronic business cards from its storage or the electronic business card local file 203. The communication program 204 displays a received electronic business card or a previously received one that is stored in the communication program local file 280, one of its storages, on the screen of the display 223.

The electronic business card processing program 202 transmits a produced electronic business card via the communication program 204. The electronic business card processing program 202 displays electronic business cards received via the communication program 204 or produced/previously received electronic business cards stored in the electronic business card local file 203 on the screen of the display 223. The electronic business card processing program 202 stores electronic business cards received via the communication program 204 in the electronic business card local file 203 and the storage for the communication program 204.

A key pair 206, a public key 206-1, a secret key 206-2, an electronic certificate 207, and a security program 208 will be described below.

In the electronic business card exchange system described above with reference to FIG. 2, electronic business cards are stored not only in the electronic business card local file 203 but in the DB server 270, one of storages for the communication program 204. Thus, even if the PC 200 is a company PC, it is possible to access the DB server 270 from outside an office such as from another PC to view electronic business cards. The electronic business card processing program 202 operates with the communication program 204 as backend, however, the electronic business card processing program 202 may not be installed on the PC 200. Even in such a case, the communication program 204 can display received electronic business cards stored in the storage for the communication program 204 (i.e., the communication program local file 280 and the DB server 270) on the screen of the display 223 on its own.

[Description of Operation]

Operation of the electronic business card exchange system of the embodiment having the system configuration described above will be described.

(The Electronic Business Card Processing Program)

The electronic business card processing program 202 has such functions as follows. Details on individual capabilities will be discussed later.

(1) Electronic Business Card Producing Function

This function is for producing/editing an electronic business card in the form of an image.

(2) Management of Society Records (A Contact List)

When an electronic business card is transmitted or received, a communication record for the transmission/reception is stored in the electronic business card local file 203 and maintained as a society record.

Information processing for realizing those capabilities will be described below.

(Electronic Business Card Local File)

Information that is managed by storing to the electronic business card local file 203 includes following pieces of information:

(1) Associated information such as the type of a produced electronic business card 201 and security settings for the same (2) Society record relating to electronic business cards Society record includes communication records such as time and date of reception of an electronic business card 201, the e-mail address of a sender, sender name, time and date of transmission of an electronic business card, the e-mail address of the recipient, and recipient name. Society record further includes various types of information on interaction with others that is input from the input device 224 such as a keyboard by a user or indicated by an electronic business card.

(3) An address book and other business card related information that are generated based on contact information obtained from electronic business cards (or e-mails and other sources).

These pieces of information are stored in the electronic business card local file 203 being associated with electronic business cards maintained by the apparatus. Data including the types described above may be stored in the electronic business card local file 203 as one record (i.e., a data set), or information of those types may be stored in the electronic business card local file 203 for information type.

Information processing relating to the invention will be now described. The information processing is performed by the CPU 221 loading the electronic business card processing program 202, security program 208 and communication program 204 stored in the HD 210 into the system memory 222 and reading out and executing the same.

(Electronic Business Card Producing Function)

Figure 3:
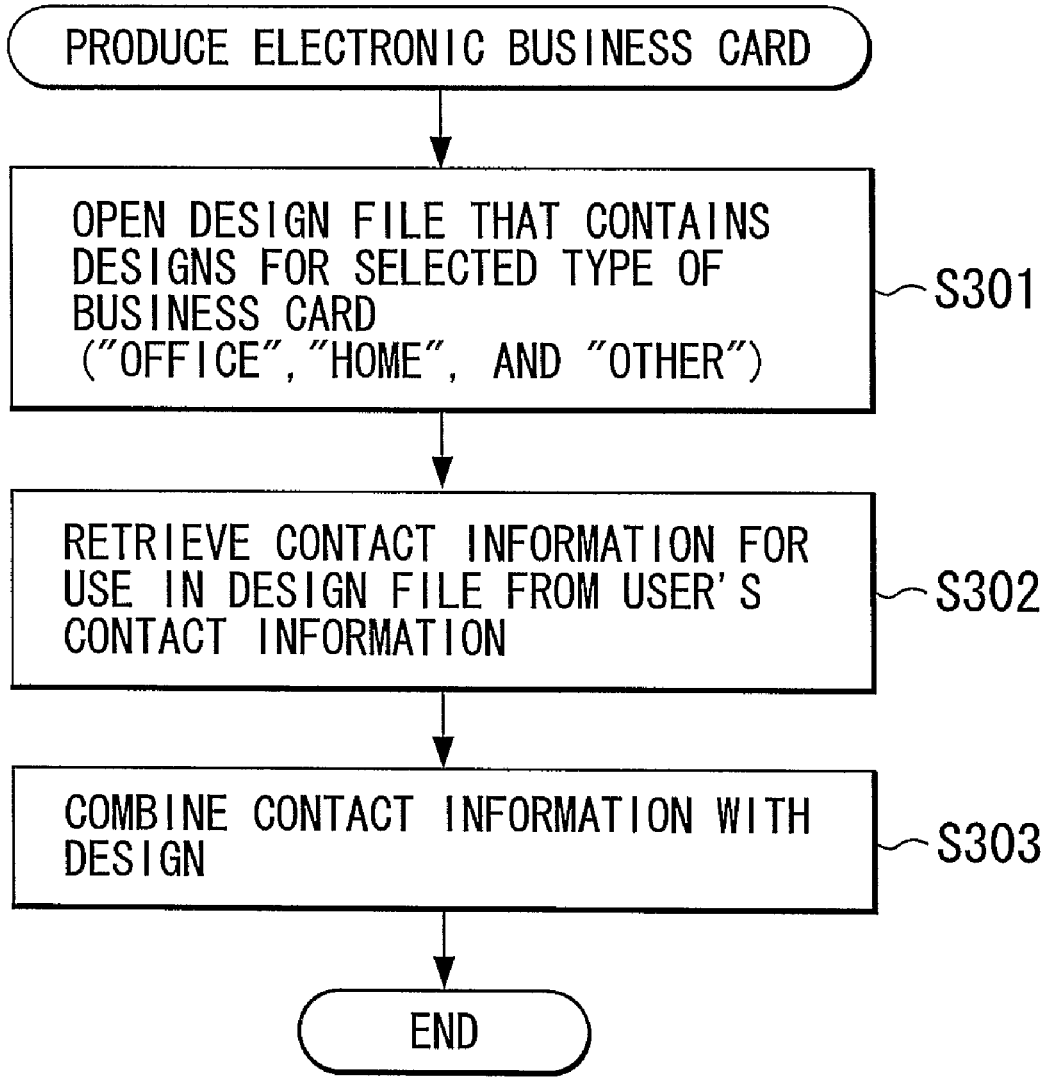
FIG. 3 is a flowchart illustrating production of an electronic business card that is included in an electronic business card processing program of an embodiment to which the invention can be applied.

FIG. 3 shows a flowchart illustrating the process of producing an electronic business card that is included in the electronic business card processing program 202. As process of producing an electronic business card is well known, it will be described only briefly.

For example, when the user selects a menu for composing an electronic business card from information shown on a display screen, the processing program shown in FIG. 3 is executed by the CPU 221. In accordance with the user's instruction, the CPU 221 selects and opens an desired business card image for a background image from a business card design file that is prepared in the HD 210 (the image is temporarily stored in the system memory 222 and also displayed on the screen of the display 223) (step S301). In this embodiment, separate business card design files for three usages, i.e., office, home, and other, are provided, and the user can select a desired image from a design file for his/her usage.

The user then instructs the CPU 221 to retrieve his/her contact information initially registered in the electronic business card local file 203. In response, the CPU 221 retrieves the user's contact information (in the form of character codes) from the electronic business card local file 203 and stores the same in the system memory 222 temporarily (step S302).

The CPU 221 converts the contact information temporarily stored in the system memory 222 in the form of character code to an image. The CPU 221 superimposes the converted image on the business card image for the background image selected at step S301 in the system memory 222, and displays the resulting image on the display screen (step S303).

When the user indicates a position for contact information on the display screen using the input device 224 such as a mouse, the CPU 221 moves the contact information to the indicated position. Specifically, the CPU 221 lays out the contact information at the position on the background business card image indicated by the user in the system memory 222 to re-create a new business card image. Then, the CPU 221 displays the resulting business card image on the screen of the display 223.

The CPU 221 can be configured to produce an electronic business card to be provided for use in accordance with the flow shown in FIG. 3 every time an electronic business card is used. Here, to use an electronic business card means to attach a business card to an e-mail and the like.

When the user indicates termination with a mouse or a keyboard, the CPU 221 generates a data set in a data format of an electronic business card standard (e.g., RFC2426) including contact information, its layout position, and background image data. The CPU 221 then stores the data set in a dedicated storage area in the HD 210 (i.e., the electronic business card local file 203).

(Management of Communication Records)

Management of society records that is included in the electronic business card processing program 202 will be described. When a produced electronic business card is transmitted and when an electronic business card is received from another PC 200, transmission and reception records are saved as a society record in the electronic business card local file 203. For example, communication records included in a society record is the e-mail address of the recipient of an electronic business card (in the case an electronic business card is transmitted) or the sender of an electronic business card (in the case an electronic business card is received) and time and date of the transmission/reception. A communication record also includes an encryption key (i.e., a received public key) for ciphered (encrypted) communication with an e-mail address.

An address book contains addresses of persons with whom transmission/reception has been performed. The address book describes electronic business card information retrieved from received electronic business cards, that is, address book information such as name, address, and telephone number. The address book is linked to communication records, so that it is possible to retrieve a communication record for a person from his/her name in the address book and retrieve address book information for an appropriate person from a communication record (a transmission/reception record) and/or an e-mail address in a communication record.

Further, when an electronic business card is received by way of electronic mail from another PC 200, contact information provided by the business card can be newly registered in the address book automatically or manually, or contact information previously registered can be updated with received contact information. For example, if contact information contained in an electronic business card complies with RFC2426, contact information such as name, address, and telephone number can be registered to the address book or updated by referring to individual attribute values.
(Security Program)

The CPU 221 executes the security program 208 to cipher (encrypt) an electronic business card and other information to be transmitted by the PC 200 or decipher (decrypt) a ciphered electronic business card and other information transmitted from another PC 200.

For example, when an electronic business card and other information are transmitted/received being ciphered, the CPU 221 executes 3DES algorithm using the public key 206-1 or secret key 206-2 and ciphers/deciphers the electronic business card and other information for output.

The CPU 221 also generates the public key 206-1 or secret key 206-2 for use in ciphering/deciphering of an electronic business card and other information by means of the security program 208.

The CPU 221 executes SH1 algorithm, ciphers a public key and generates a digital signature for data to be transmitted using the security program 208.

The CPU 221 can also issue the electronic certificate 207 with the security program 208. For example, it issues an electronic certificate that includes a generated public key or an algorithm such as SH1 that is used in generation of a digital signature.

The CPU 221 can further verify an electronic certificate and a digital signature it receives using the security program 208.
(Electronic Certificate)

The electronic certificate 207 is well known. For example, it is an electronic certificate complying with X.509, a standard recommended by the International Telecommunication Union (ITU). The electronic certificate 207 includes entries such as the version number of the public key 206-1, the serial number of the certificate, public key information, information on a certificate authority that issued the certificate, validity period of the certificate, information on the authenticated entity, and expansion area. The expansion area may contain information such as e-mail address and Internet Protocol (IP) address.

The electronic certificate 207 may be an electronic certificate issued by a certificate authority (e.g., http://officeupdate.microsoft.com/office/redirect/10/outldigid.asp?/helpldc=1401), an electronic certificate issued by the information management division of an organization to which the user belongs, and an electronic certificate that is generated by the CPU 221 executing the security program 208 on the user's PC 200 as in the embodiment as discussed later.
(Public Key and Secret Key)

The public key 206-1 and the secret key 206-2 are well known. The public key 206-1 and the secret key 206-2 form a key pair 206, and data ciphered using one of the keys can be deciphered using the other key (i.e., public key cryptography). In general, the public key 206-1 is a key that is open to the third party out of the key pair 206. The public key 206-1 and secret key 206-2 are generated by the CPU 221 executing the security program 208 and stored in any area in the HD 210.
(Digital Signature)

Digital signature is well known. For example, by applying public key cryptography, it is possible to provide a digital signature that authenticates the sender of data and ensures that the data has not been tampered. It is also possible to combine one-way hash functions such as SH1 to provide a digital signature. Information indicating an algorithm that is used in a digital signature can be confirmed with an electronic certificate. A digital signature is generated by the security program 208 being executed by the CPU 221.
(Communication Program)

The communication program 204 is a communication program for transmitting/receiving electronic business cards to/from other PCs 200. The communication program 204 of the embodiment is, but not limited to, an electronic mail software program. As other forms of the communication program 204, various communication programs may be used depending on usage, e.g., a communication program for data transmission using File Transfer Protocol (FTP).

However, in terms of generality, communication is preferably realized by electronic mail. Further, when the electronic certificate 207 or digital signature is employed, it is desirable that an S/MIME data format is supported such as RFC2315, which is standardized by IETF.

The HD 210 further contains an operating system (OS) program, however, detailed description will not be necessary as commercially available OSs are well known. The HD 210 also stores therein background images for use in composing an electronic business card and various data necessary for business card processing.
(Data Format of Electronic Business Card)

An electronic business card of the embodiment has such a data format as follows:

Electronic business card data format=vcf+design defining XML+(cert. information)+DNF flag Vcf is a format for storing contact information in vCard format, which is a standard format for electronic business card defined by Internet Mail Consortium (IMC). The design defining XML is description of a business card image for a background image in extendable Markup Language (XML). Application of vcf and design defining XML to an electronic business card corresponds to the process flow described above with reference to FIG. 3.

The cert. information is information on a digital signature and an electronic certificate, and is deleted from an electronic business card if contact information has been modified from corresponding contact information already stored in the electronic business card local file 203 when an electronic business card is produced The DNF flag is a flag indicating Do Not Forward (DNF): when this flag is on, the electronic business card is not to be forwarded. Application of cert. information and DNF flag to an electronic business card will be described in detail below.
(Transmission of Electronic Business Card)

Figure 4:
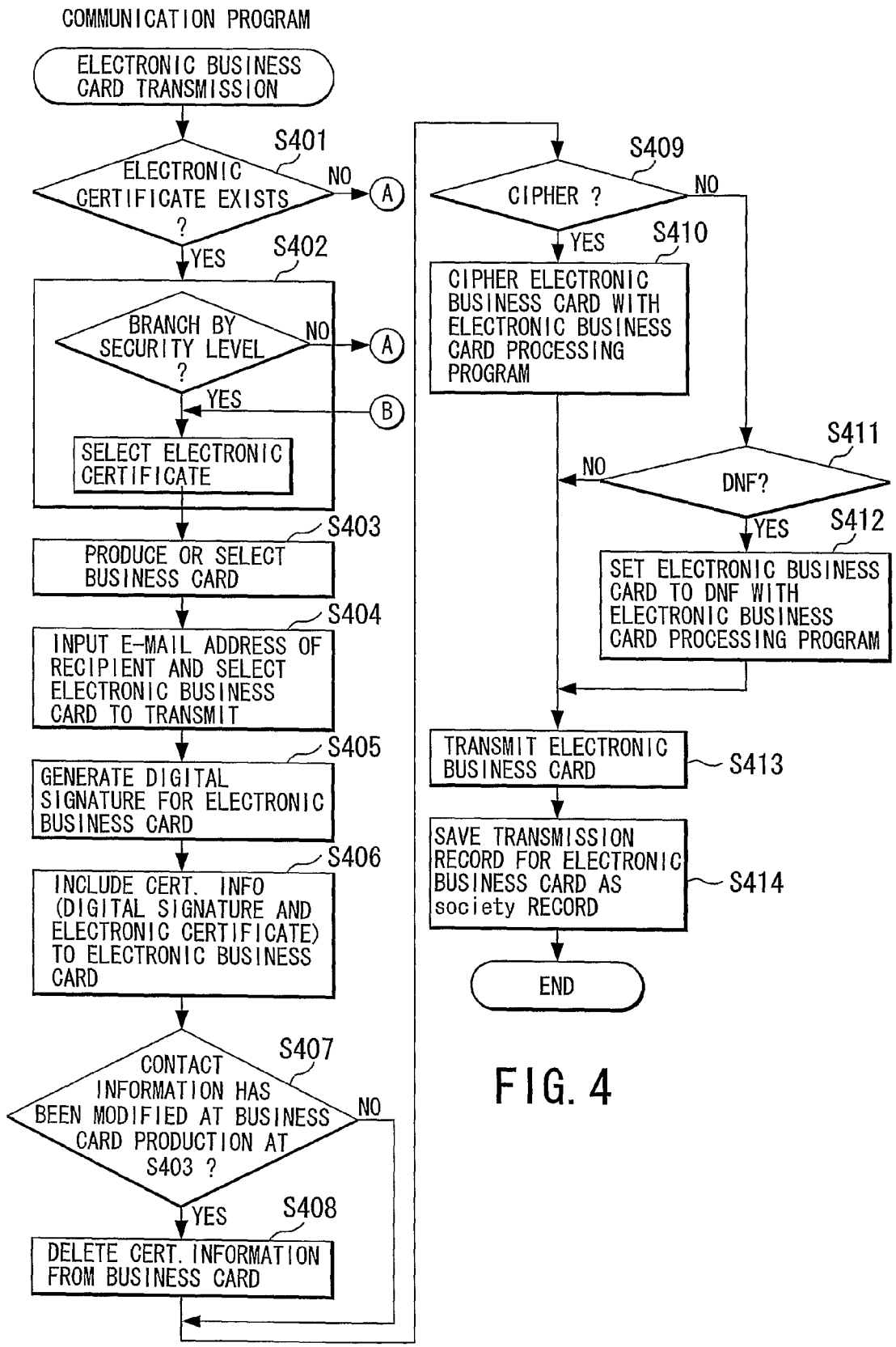
FIG. 4 is a flowchart illustrating transmission of an electronic business card that is included in a communication program of an embodiment to which the invention can be applied.
Figure 5:
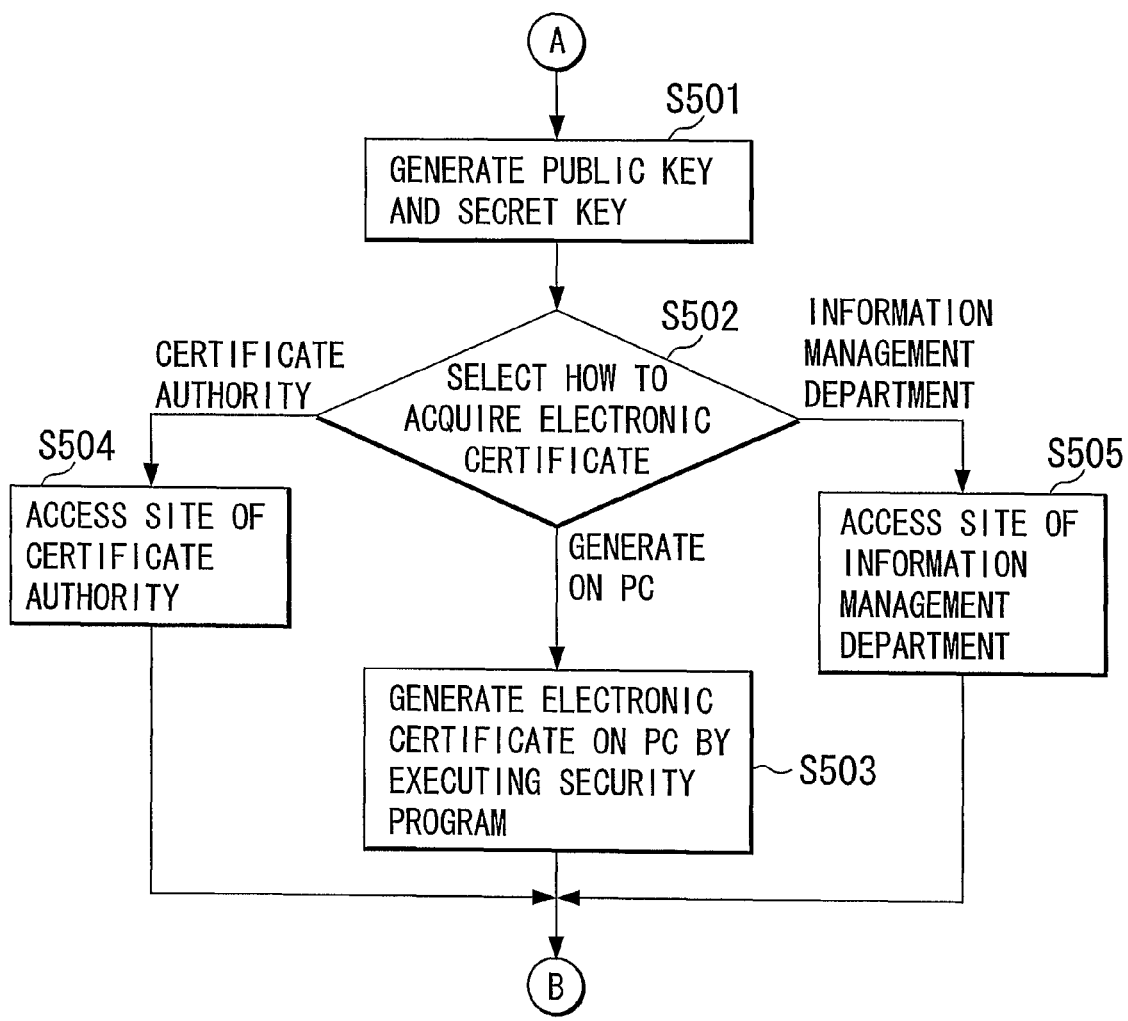
FIG. 5 is a flowchart illustrating transmission of an electronic business card that is included in a communication program of an embodiment to which the invention can be applied.

FIGS. 4 and 5 are flowcharts showing the process of electronic business card transmission included in the communication program 204.

At step S401 of FIG. 4, the CPU 221 searches for an existing electronic certificate in the HD 210. If no existing electronic certificate is found, the CPU 221 proceeds to the process of obtaining or generating an electronic certificate (FIG. 5). If an existing electronic certificate is found, the CPU 221 proceeds to the process at step S402.

At step S402, the CPU 221 selects the found electronic certificate for the electronic certificate 207 for use in transmission/reception of an electronic business card or other information. Here, it is also possible to proceed to acquisition or generation of a new electronic certificate (FIG. 5) after determining security level based on the validity period and the like of an existing electronic certificate.

At step S403, the CPU 221 produces or selects an electronic business card according to the user's instruction. Production of an electronic business card includes execution of the electronic business card processing program 202 to perform the process which has been described above with reference to FIG. 3 if the user selects a menu for producing an electronic business card from information on the display screen. Selection of an electronic business card includes selection from electronic business cards stored in the electronic business card local file 203 if the user selects the menu for electronic business card selection from information on the display screen.

At step S404, the CPU 221 selects or inputs a recipient in accordance with the user's instruction and selects an electronic business card to transmit. In this embodiment, since an electronic business card is transmitted in the form of an electronic mail, the e-mail address of the recipient is input.

At step S405, the CPU 221 generates a digital signature to be attached to the electronic business card to transmit. For example, the digital signature is generated by the CPU 221 executing the security program, generating a message digest using SH1 algorithm on the electronic business card, and ciphering the message digest with the sending user's secret key.

At step S406, the CPU 221 includes cert. information (i.e., the digital signature and the electronic certificate) in the electronic business card.

Then, at step S407, the CPU 221 determines whether contact information for the latest electronic business card has been modified from contact information for that electronic business card already stored in the electronic business card local file 203 in electronic business card production at step S403. Here, contact information for the electronic business card may be compared to corresponding contact information already stored in a known manner.

If contact information for the electronic business card has been modified from corresponding contact information already stored in the electronic business card local file 203, the CPU 221 deletes the previous cert. information from the electronic business card at step S407.

Then, at step S409, the CPU 221 ciphers the electronic business card to be transmitted with the ciphering function of the electronic business card processing program 202 if the user instructs ciphering (step S410). For example, the CPU 221 may execute the security program and cipher the electronic business card with 3DES algorithm that uses the recipient's public key.

On the other hand, if the user does not instruct ciphering at step S409 but requests DNF at step S411, the CPU 221 turns on the DNF flag (i.e., Do Not Forward) of the electronic business card to be transmitted with the DNF flag updating function of the electronic business card processing program 202 (step S412).

At step S413, the CPU 212 transmits the electronic business card. The electronic business card can be transmitted in an S-MIME data format. When the electronic business card contains cert. information (i.e., a digital signature and an electronic certificate), it contains information indicating the e-mail address and public key of the sending user, an algorithm used for ciphering of the electronic business card and so on. Thus, another PC 200 can use the information such as a public key contained in the received electronic certificate to verify the received digital signature and decipher the ciphered electronic business card.

At step S414, the CPU 221 executes the electronic business card processing program to save a transmission record for the electronic business card as a society record in the electronic business card local file 203.

(Acquisition or Generation of an Electronic Certificate)

Referring to FIG. 5, acquisition or generation of an electronic certificate will be described.

At step S501, the CPU 221 generates a key pair of a public key and a secret key. The public key and secret key can be generated using a key pair generation technique such as well-known RSA encryption algorithm. If an existing key pair is present in the HD of the PC 200, that is, a known key pair exists but there is no electronic certificate associated with the public key of the key pair, generation of a key pair at step S501 is not necessary. In this case, the procedure may proceed to step S502 immediately.

At step S502, the CPU 221 selects the way to obtain an electronic certificate according to the user's instruction. The public key of the key pair generated at step S501 or an existing public key will be associated with the electronic certificate.

Selection is made from among whether to acquire an electronic certificate from a certificate authority, or from the information management department of an organization to which the user belongs, or to generate one by executing the security program on the PC 200.

If an electronic certificate is to be acquired from a certificate authority, the communication program 204 navigates to a certificate authority (step S504). For instance, the CPU 221 activates a browser on the PC 200 to access the site of a certificate authority using its uniform resource locator (URL). After an electronic certificate is obtained from the certificate authority, the process of FIG. 5 terminates.

Similarly, if an electronic certificate is to be acquired from the information management department of an organization to which the user belongs, the communication program 204 navigates to the site of the information management department (step S505). For example, the CPU 221 may activate a browser on the PC 200 and access the site of the information processing management department on an intranet. After an electronic certificate is obtained from the information management department, the process of FIG. 5 terminates.

If an electronic certificate is to be generated on the PC 200 by executing the security program, the CPU 221 proceeds to process at step S503.

At step S503, the CPU 221 executes the security program on the PC 200 to generate an electronic certificate. For example, an electronic certificate of a format defined by X.509 may be generated and stored in the HD 210, then the process in FIG. 5 terminates.

Steps S401 and S402 in FIG. 4 and the process in FIG. 5 are preferably performed after the electronic business card processing program 202 is installed in the HD 210 of the PC 200.

(Reception of an Electronic Business Card by the Communication Program: when the Electronic Business Card Processing Program is not Installed.)

Figure 6:
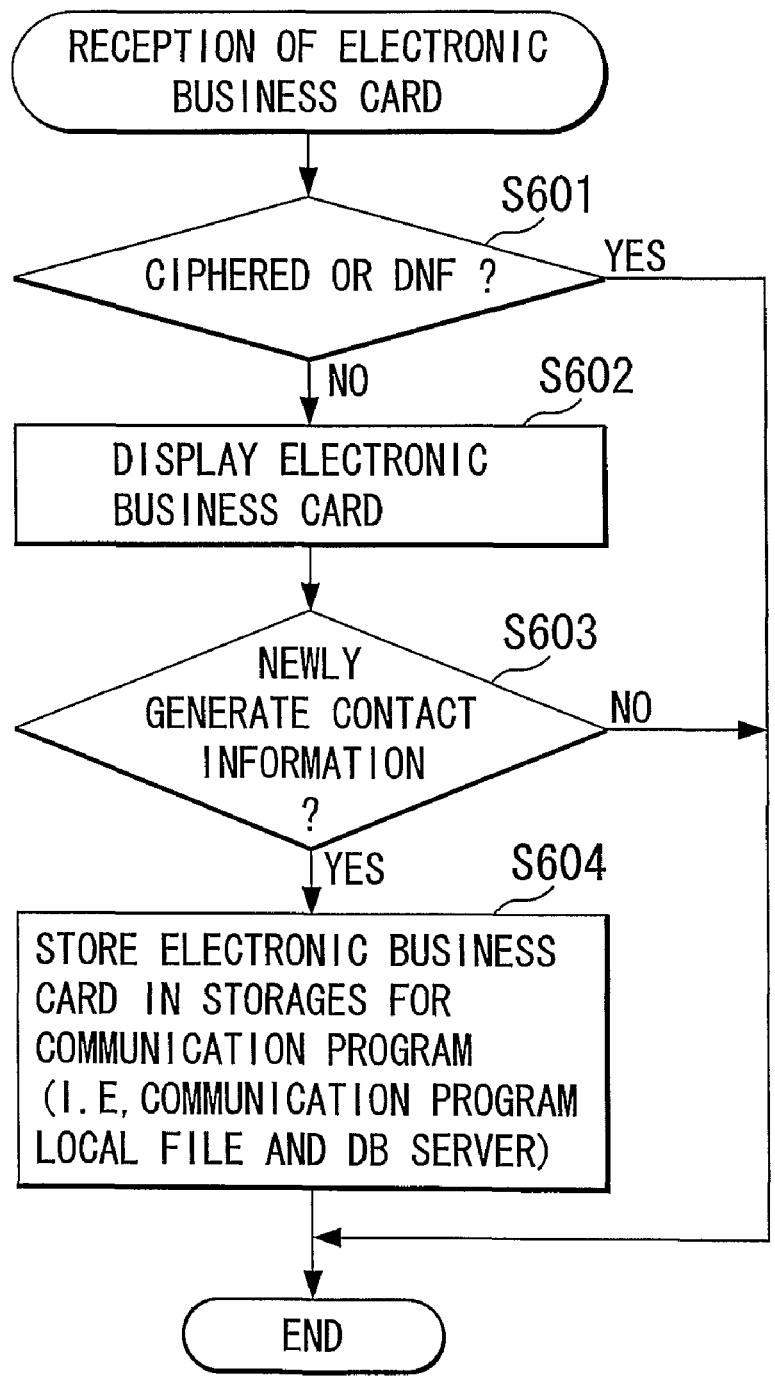
FIG. 6 is a flowchart illustrating reception of an electronic business card (for a case an electronic business card processing program is not installed) that is included in a communication program of an embodiment to which the invention can be applied.

FIG. 6 shows a flowchart of electronic business card reception included in the communication program 204 (for a case where the electronic business card processing program is not installed). Reception of an electronic business card by a user using only the communication program 204 will be described.

At step S601, the CPU 221 determines whether a received electronic business card is ciphered or DNF flag is on (i.e., Do Not Forward). If the received electronic business card is ciphered or DNF (Do Not Forward) is on, the CPU 221 terminates the process. The received electronic business card cannot be viewed due to ciphering and incidental transfer of the electronic business card can be prevented by DNF, so that enhanced security can be provided.

Meanwhile, if the received electronic business card is not ciphered and DNF is not set, the CPU 221 proceeds to the process at step S602.

At step S602, the CPU 221 displays the received electronic business card on the screen of the display 223.

If the user instructs to newly generate contact information for the electronic business card in the system upon viewing business card information at step S603, the CPU 221 proceeds to the process at step S604.

At step S604, the CPU 221 stores the received electronic business card in storage for the communication program 204 (i.e., the communication program local file 280 and the DB server 270).

(Reception of an Electronic Business Card by the Electronic Business Card Processing Program)

Figure 7:
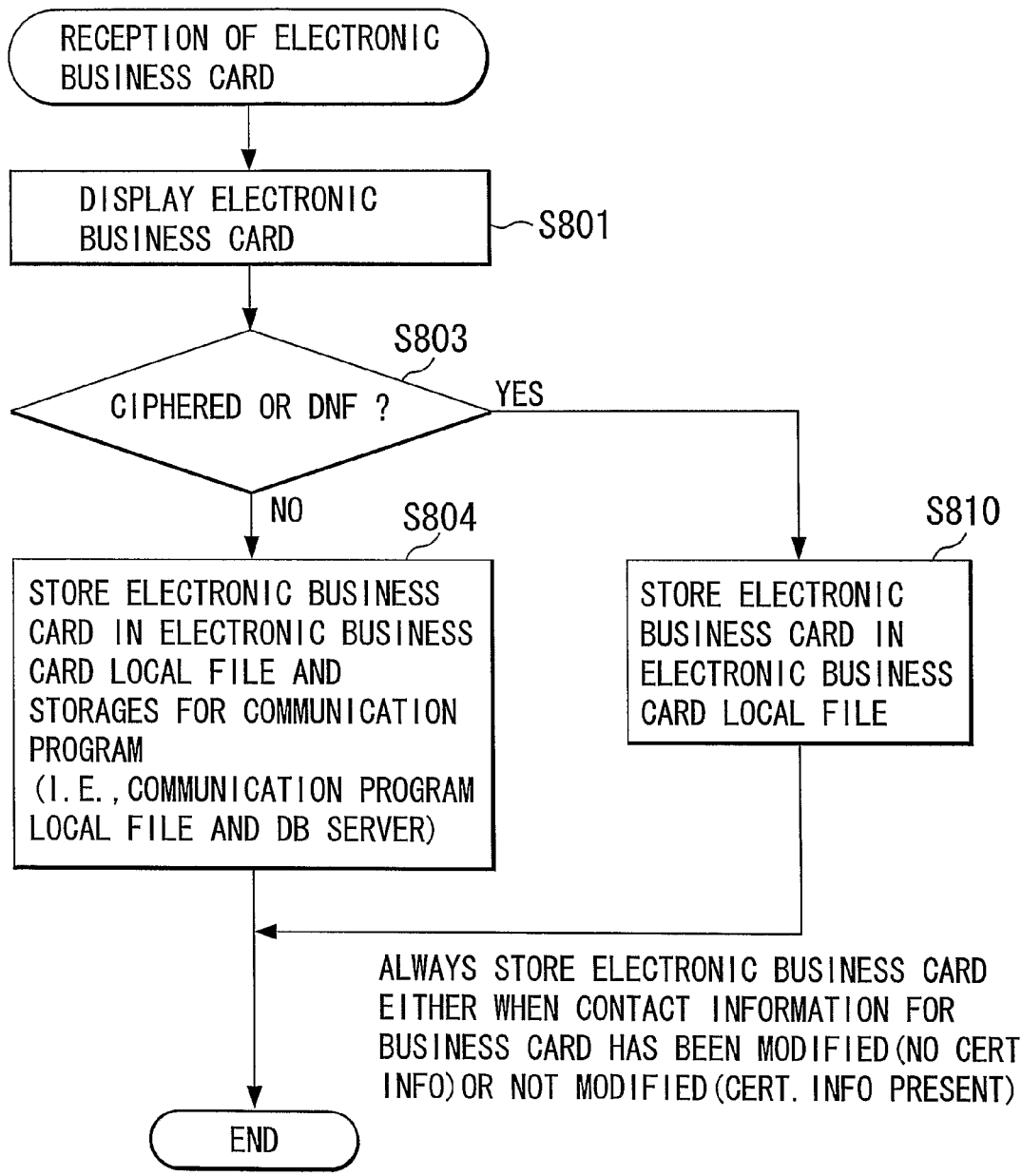
FIG. 7 is a flowchart illustrating reception of an electronic business card that is included in an electronic business card processing program of an embodiment to which the invention can be applied.

FIG. 7 shows a flowchart of electronic business card reception that is included in the electronic business card processing program 202. The following description will refer to a case where the user receives an electronic business card using the electronic business card processing program 202 (via the communication program 204).

At step S801, the CPU 221 displays a received electronic business card on the screen of the display 223. Here, if the received electronic business card is ciphered, the CPU 221 indicates it on the display screen. Then, the CPU 221 deciphers the electronic business card and other information using a public key that is input by a party who can view the ciphered electronic business card (i.e., one who has the public key from the sender), and outputs the same.

Then, at step S803, the CPU 221 determines whether the received electronic business card is ciphered or DNF flag is on (i.e., Do Not Forward). If the received electronic business card is ciphered or DNF is on (Do Not Forward), the CPU 221 stores the electronic business card in the electronic business card local file 203 (step S810). Consequently, only a recipient who has the public key from the sender can view the received electronic business card due to ciphering and incidental transfer of the electronic business card can be prevented by DNF, which can provide enhanced security.

On the other hand, if the received electronic business card is not ciphered and DNF is not set, the CPU 221 stores the electronic business card in the electronic business card local file 203 and storage for the communication program 204 (i.e., the communication program local file 280 and DB server 270) at step S804.

Either if the received electronic business card contains no cert. information (i.e., contact information for the received electronic business card has been modified) or there is cert. information (i.e., contact information for the electronic business card has not been modified), the CPU 221 stores the received electronic business card in the electronic business card local file 203 and/or storage for the communication program 204 (the communication program local file 280 and DB server 270) at steps S804 and S810. In this case, if there is no cert. information for the stored electronic business card, absence of cert. information can indicate that contact information for the card has been modified when the electronic business card was produced and thus is unreliable information.

[Operation]

As has been thus described, according to the embodiment, in a first aspect, there is provided an electronic business card exchange system (FIG. 2) with a plurality of terminals (200) exchanging electronic business cards and a server (270) being connected via a communication network (250), characterized in that the terminal comprising: first storage means (280) capable of storing electronic business cards; second storage means (203) capable of storing electronic business cards; display means (223) capable of displaying an electronic business card; communication means (204) for performing processing including transmission and reception of an electronic business card and display of the electronic business card on the display means, the communication means storing a received electronic business card in the server and the first storage means; and electronic business card processing means (202) for performing processing including production of an electronic business card and display of the electronic business card on the display means, the electronic business card processing means for storing an electronic business card received via the communication means in the server and the first storage means, or in the second storage means.

With such a configuration, since electronic business cards are also stored in the DB server 270, it is possible to access the DB server 270 to view electronic business cards from outside an office such as from another PC even if the PC 200 is a company's PC, for example. In addition, even if the electronic business card processing program 202 is not installed on the PC 200, the communication program 204 alone can display a received electronic business card that is stored in the communication program local file 280 on the screen of the display 223.

Here, in a second aspect, the system of the first aspect can be characterized in that if the electronic business card produced by the electronic business card processing means is determined to have been modified from the electronic business card already stored in the second storage means, the communication means transmits the electronic business card without adding authentication information thereto (step S408 and S413); and the electronic business card processing means stores the electronic business card having no authentication information added thereto received via the communication means in the server and the first storage means, or in the second storage means (S804 and S810).

Consequently, absence of cert. information for a stored electronic business card can indicate that contact information for the electronic business card has been modified from corresponding contact information already stored in the electronic business card local file 203 and thus is unreliable information.

In a third aspect, the system of the first and second aspects can be characterized in that the communication means ciphers, by means of the electronic business card processing means, the electronic business card produced by the electronic business card processing means and transmits the same (S410 and S413); if the received electronic business card is ciphered, the communication means does not store the received electronic business card (S601); and if the electronic business card received via the communication means is ciphered, the electronic business card processing means stores the received electronic business card in the second storage means (S803 and S810).

In a fourth aspect, the system of the first and second aspect can be characterized in that the communication means transmits the electronic business card produced by the electronic business card processing means after adding thereto information not to be transferred by the electronic business card processing means (S412 and S413); if the received electronic business card has information not to be transferred added thereto, the communication means does not store the received electronic business card (S601); and if the electronic business card received via the communication means has information not to be transferred added thereto, the electronic business card processing means stores the received electronic business card in the second storage means (S803 and S810).

With such a configuration, only a recipient who has the public key from the sender can view the received electronic business card due to ciphering and incidental transfer of the electronic business card can be prevented by DNF, which can provide enhanced security.

In a fifth aspect, a terminal that exchanges electronic business card in an electronic business card exchange system is characterized by having the functions of the terminal of the electronic business card exchange system according to any of the first to fourth aspects.

Further, in a sixth aspect, an electronic business card exchange method for an electronic business card exchange system with a plurality of terminals exchanging electronic business cards and a server being connected via a communication network, the terminal having first storage means capable of storing electronic business cards, second storage means capable of storing electronic business cards, and display means capable of displaying an electronic business card, the method is characterized by comprising: a first storage step (S604) of, when communication means for performing processing including transmission and reception of an electronic business card and display of the electronic business card on the display means is selected, storing by the communication means a received electronic business card in the server and the first storage means; and a second storage step (S804 or S810) of, when electronic business card processing means for performing processing including production of an electronic business card and display of the electronic business card on the display means is selected, the electronic business card processing means storing the electronic business card received via the communication means in the server and the first storage means, or in the second storage means.

Here, in a seventh aspect, the method of the sixth further comprises a first transmission step of, if it is determined that the electronic business card produced by the electronic business card processing means has been modified from the electronic business card already stored in the second storage means, the communication means transmitting the electronic business card without adding authentication information thereto; characterized in that at the second storage step, the electronic business card processing means stores the electronic business card transmitted at the first transmission step and received via the communication means that has no authentication information added thereto in the server and the first storage means, or in the second storage means.

In an eighth aspect, the method of the sixth or seventh aspect further comprises a second transmission step of the communication means ciphering, by means of the electronic business card processing means, the electronic business card produced by the electronic business card processing means and transmitting the same; characterized in that at the first storage step, if the received electronic business card is ciphered, the communication means does not store the received electronic business card; and that at the second storage step, if the electronic business card received via the communication means is ciphered, the electronic business card processing means stores the received electronic business card in the second storage means.

In a ninth aspect, the method of the sixth or seventh aspect further comprises a third transmission step of the communication means transmitting the electronic business card produced by the electronic business card processing means after adding thereto information not to be transferred thereto by the electronic business card processing means; characterized in that at the first storage step, if the received electronic business card has information not to be transferred added thereto, the communication means does not store the received electronic business card; and that at the second storage step, if the electronic business card received via the communication means has information not to be transferred added thereto, the electronic business card processing means stores the received electronic business card in the second storage means.

In a tenth aspect, a program is characterized in that it causes a computer to execute steps performed by the communication means of the electronic business card exchange method according to any of the sixth to ninth aspects.

In an eleventh aspect, a program is characterized in that it causes a computer to execute steps performed by the electronic business card processing means of the electronic business card exchange method according to any of the sixth to ninth aspects.

Other Embodiments

While the above embodiment has been described for illustrating the invention, various modifications are possible. Such modifications fall within the technical scope of the invention as long as they are based on the technical spirit of the invention as set forth in Claims.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes.

What is claimed is:

1. An electronic business card exchange system including a server and terminals comprising:
   an electronic business card local file that is a first storage unit that is local to a first terminal for storing electronic business cards;
   a communication program local file that is a second storage unit that is local to the first terminal for storing electronic business cards;
   a display unit for displaying an electronic business card;
   a communication unit for performing processing including transmission and reception of an electronic business card and display of the electronic business card on the display unit, the communication unit storing a received electronic business card in both the server and the first storage unit when the received electronic business card is not ciphered and wherein the communication unit does not store the received electronic business card when it is ciphered; and
   an electronic business card processing unit for performing processing including production of an electronic business card and display of the electronic business card on the display unit, the electronic business card processing unit storing an electronic business card received via the communication unit in the second storage unit, the server and the first storage unit when the received business card is not ciphered and storing the received business card only in the second storage unit when the received business card is ciphered.

2. The electronic business card exchange system according to claim 1, wherein
   when the electronic business card produced by the electronic business card processing unit is determined to have been modified from the electronic business card already stored in the second storage unit, the communication unit transmits the electronic business card without adding authentication information thereto; and
   the electronic business card processing unit stores the electronic business card having no authentication information added thereto received via the communication unit in the server and the first storage unit and the second storage unit.

3. The electronic business card exchange system according to claim 1, wherein the communication unit ciphers the electronic business card produced by the electronic business card processing unit and transmits the electronic business card; and the electronic business card processing unit stores the received electronic business card in the second storage unit.

4. The electronic business card exchange system according to claim 1, wherein the communication unit transmits the electronic business card produced by the electronic business card processing unit after adding thereto information not to be transferred by the electronic business card processing unit;

the electronic business card processing unit stores the received electronic business card in the second storage unit.

5. A terminal that exchanges electronic business cards in an electronic business card exchange system, a plurality of the terminals and a server being connected via a communication network in the electronic business card exchange system, the terminal comprising:

an electronic business card local file that is a first local storage unit capable of storing electronic business cards;

a communication program local file that is a second local storage unit capable of storing electronic business cards;

a display unit capable of displaying an electronic business card;

a communication unit for performing processing including transmission and reception of an electronic business card and display of the electronic business card on the display unit, the communication unit storing a received electronic business card in the server and the first storage unit when the received electronic business card is not ciphered and wherein the communication unit does not store the received electronic business card when it is ciphered; and an electronic business card processing unit for performing processing including production of an electronic business card and display of the electronic business card on the display unit, the electronic business card processing unit storing an electronic business card received via the communication unit in the second storage unit, the server and the first storage unit when the received business card is not ciphered and storing the received business card only in the second storage unit when the received business card is ciphered.

6. An electronic business card exchange method for an electronic business card exchange system including a server and a terminal having an electronic business card local file that is a first storage unit capable of storing electronic business cards, a communication program local file that is a second storage unit capable of storing electronic business cards, and a display unit capable of displaying an electronic business card, the method comprising:

a first storage step of, when communication unit for performing processing including transmission and reception of an electronic business card and display of the electronic business card on the display unit is selected, storing by the communication unit a received electronic business card in the server and the first storage unit when the received electronic business card is not ciphered and wherein the communication unit does not store the received electronic business card when it is ciphered; and a second storage step of, when electronic business card processing unit for performing processing including production of an electronic business card and display of the electronic business card on the display unit is selected, the electronic business card processing unit storing the electronic business card received via the communication unit in the second storage unit, the server and the first storage unit when the received business card is not ciphered and storing the received business card only in the second storage unit when the received business card is ciphered.

7. The electronic business card exchange method according to claim 6, further comprising:

a transmission step of, if it is determined that the electronic business card produced by the electronic business card processing unit has been modified from the electronic business card already stored in the second storage unit, the communication unit transmitting the electronic business card without adding authentication information thereto;

wherein at the second storage step, the electronic business card processing unit stores the electronic business card transmitted at the transmission step and received via the communication unit that has no authentication information added thereto in the server and the first storage unit, and the second storage unit.

8. The electronic business card exchange method according to claim 6, further comprising:

a transmission step of the communication unit ciphering the electronic business card produced by the electronic business card processing unit and transmitting the electronic business card;

wherein at the first storage step, the communication unit does not store the received electronic business card; and at the second storage step, the electronic business card processing unit stores the received electronic business card in the second storage unit.

9. The electronic business card exchange method according to claim 6, further comprising:

a transmission step of the communication unit transmitting the electronic business card produced by the electronic business card processing unit after adding thereto information not to be transferred thereto by the electronic business card processing unit;

wherein at the first storage step, the communication unit does not store the received electronic business card; and at the second storage step, the electronic business card processing unit stores the received electronic business card in the second storage unit.

10. A computer program product on a memory device for causing a computer to execute an electronic business card exchange method for an electronic business card exchange system including a server and a terminal having a communication unit, a electronic business card processing unit, an electronic business card local file that is a first storage unit capable of storing electronic business cards, a communication program local file that is a second storage unit capable of storing electronic business cards, and a display unit capable of displaying an electronic business card, the computer program product comprising:

first program code for causing the communication unit to, when the communication unit for performing processing including transmission and reception of an electronic business card and display of the electronic business card on the display unit is selected, store the received electronic business card in the server and the first storage unit when the received electronic business card is not ciphered and wherein the communication unit does not store the received electronic business card when it is ciphered; and second program code for causing electronic business card processing unit to, when the electronic business card processing unit for performing processing including production of an electronic business card and display of the electronic business card on the display unit is selected, store the electronic business card received via the communication unit in the second storage unit, the server and the first storage unit when the received business card is not ciphered and storing the received business card only in the second storage unit when the received business card is ciphered.

11. The computer program product according to claim 10, further comprising:
   third program code for causing the communication unit to, if it is determined that the electronic business card produced by the electronic business card processing unit has been modified from the electronic business card already stored in the second storage unit, to transmit the electronic business card without adding authentication information thereto;
   wherein the second program code causes the electronic business card processing unit to store the electronic business card transmitted by the third program code unit and received via the communication unit that has no authentication information added thereto in the server and the first storage unit, or in the second storage unit.

12. The computer program product according to claim 10, further comprising:
   third program code for causing the communication unit to cipher, by the electronic business card processing unit, the electronic business card produced by the electronic business card processing unit and transmit the same;
   wherein the first program code causes the communication unit not to store the received electronic business card; and
   the second program code causes the electronic business card processing unit to store the received electronic business card in the second storage unit.

13. The computer program product according to claim 10, further comprising:
   third program code for causing the communication unit to transmit the electronic business card produced by the electronic business card processing unit after adding thereto information not to be transferred thereto by of the electronic business card processing unit;
   wherein the first program code causes the communication unit not to store the received electronic business card; and
   the second program code causes the electronic business card processing unit to store the received electronic business card in the second storage unit.

* * * * *